April 16, 1963     C. J. ZERBEST     3,085,767
TROT LINE REEL
Filed Jan. 11, 1961
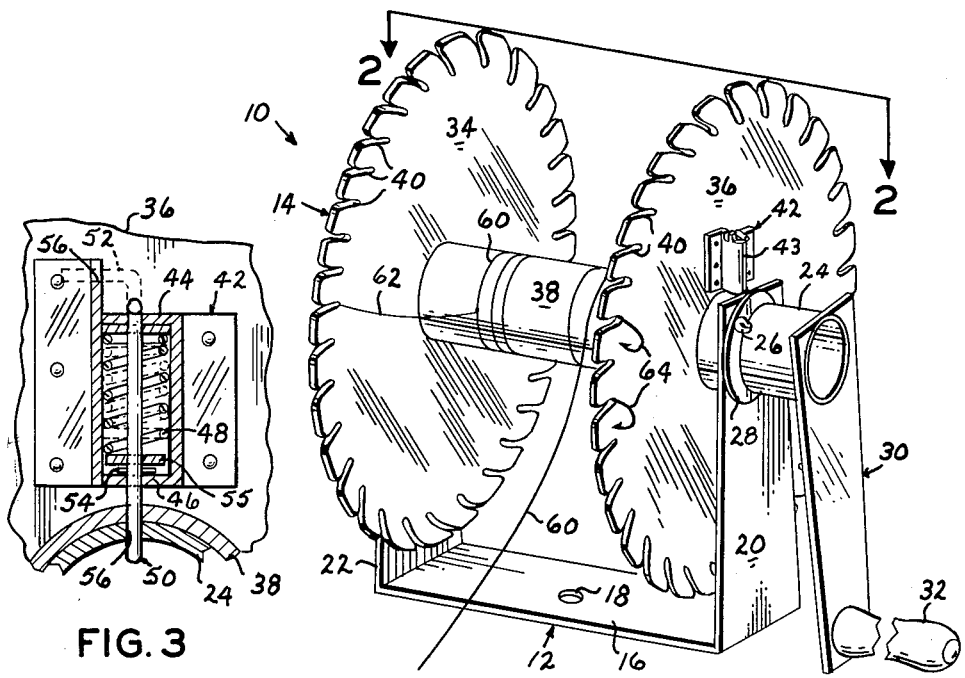
FIG. 3
FIG. 1
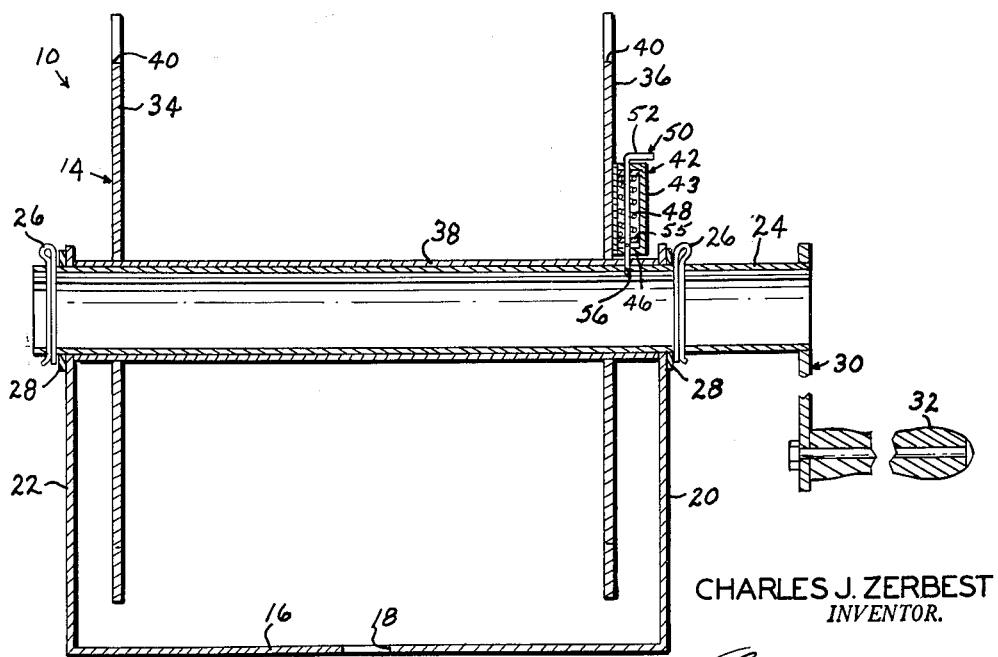
CHARLES J. ZERBEST
*INVENTOR.*
BY *Loyal J. Miller*
ATTORNEY
FIG. 2

3,085,767
TROT LINE REEL
Charles J. Zerbest, 4024 S. Youngs Blvd.,
Oklahoma City, Okla.
Filed Jan. 11, 1961, Ser. No. 82,057
1 Claim. (Cl. 242—106)

The present invention relates to fishing equipment and more particularly to a trot line holder or reel.

The principal object of the instant invention is to provide a relatively light weight windlass type reel for winding and holding a trot line.

Another object is to provide a device of this class which may be secured to a boat, or the like, for winding and unwinding a trot line on the reel.

Another object is to provide a trot line reel which may be released for unwinding the trot line therefrom as the boat is progressively moved away from a secured end of the trot line.

Still another object is to provide a trot line reel which may be manually operated to wind the trot line reel and simultaneously pull the boat toward the secured end of the trot line.

A further object is to provide a trot line reel wherein the hooks secured to the trot line are individually held by the reel to prevent tangling of the trot line hooks and leaders.

An additional object is to provide a reel which may be locked against rotation when desired.

The present invention accomplishes these and other objects by providing a U-shaped supporting bracket. A crank equipped shaft is journaled by the legs of the bracket and a reel member is journaled by the shaft between the legs of the bracket.

Other objects will be apparent from the following description when taken in conjunction with the accompanying single sheet of drawings, wherein:

FIGURE 1 is a perspective view of the device, per se;

FIGURE 2 is a vertical cross-sectional view taken substantially along the line 2—2 of FIG. 1; and FIGURE 3 is a vertical cross-sectional view, to an enlarged scale, of the reel locking member.

Like characters of reference designate like parts in those figures of the drawings in which they occur.

In the drawings:

The reference numeral 10 indicates the device, as a whole, including a mounting bracket 12 and reel 14 formed of relatively light weight metallic material such as sheet metal. The bracket 12 is substantially U-shaped having a bight portion 16 provided with a central aperture 18 for connection with a support. The bracket leg members 20 and 22 extend perpendicularly outward of the bight portion 16 in parallel relation. Apertures formed in the outer end portion of the legs 20 and 22 journal a tubular shaft 24, which may be solid in cross section, if desired, and which projects beyond the respective leg member. The shaft 24 is secured against longitudinal movement with respect to the legs 20 and 22 by cotter pins 26 extended through the shaft 24 adjacent the outwardly disposed surface of the respective leg. Washers 28 are interposed between the cotter pins and the adjacent outward surface of each respective leg around the shaft. A crank arm 30 is rigidly connected at one end to the shaft 24 and is provided at its other end with a handle 32.

The reel 14 comprises a pair of flanges or disks 34 and 36 which are axially connected to a tubular shaft or spindle 38 inwardly of the ends thereof. The shaft 38 freely surrounds the shaft 24 between the legs 20 and 22. A circumferential portion of each of the disks 34 and 36 are provided with a plurality of arcuate slots or grooves 40 which extend inwardly of the peripheral edge of the respective disk in circumferentially spaced-apart relation and form a tooth-like edge on each disk.

The edges of each groove 40 are disposed in inwardly converging relation from the peripheral edge of the respective disk. The purpose of the grooves 40 is to receive and hold trot line hooks in a manner more fully explained hereinbelow.

A spring retaining bracket 42 is secured to the outer face of the disk 36 adjacent the periphery of the shaft 38. The bracket 42 includes an arcuate intermediate portion 43 closed at its opposing ends by integral end members 44 and 46 which maintain a helical spring 48 within the bracket. Each of the end members 44 and 46 is centrally drilled for receiving a locking pin 50. As seen in FIGS. 2 and 3, the locking pin 50 is substantially L-shaped to form a handle portion 52 which projects laterally of the bracket 42. A key 54 is extended through the pin 50 between the end member 46 and a washer 55 contacting the adjacent end of the spring 48 whereby the latter normally urges the end of the pin opposite the L-shaped end downwardly toward engagement within an aperture 56 co-operatively formed in the walls of the shafts 24 and 38. A portion of the bracket 42 is provided with a slot 56 for receiving the handle portion 52 of the pin to maintain the reel 14 in unlocked or released relation with respect to the shaft 24.

*Operation*

In operation the bracket 12 is secured to a suitable support by a bolt, not shown, extended through the hole 18 or by a suitable conventional C-clamp, or the like, not shown. One end of a trot line 60 is secured to the reel 14 and progressively wound around the shaft 38 by manually rotating the crank 30. As each leader 62, forming a part of the trot line 60, is reached in winding the trot line on the shaft 38, the respective trot line fishhooks 64 are each placed within one of the grooves 40 with the hook portion of the fishhook disposed adjacent the outer surface of the respective disk 34 or 36. When setting the trot line its free end is connected to a suitable anchor and the pin 50 is released from the shaft 24. This releases the reel 14 so that as the boat is moved away from the anchored end of the trot line the latter will be unwound by rotation of the reel. The trot line 60 may be rewound on the reel by manually rotating the crank 30 which will pull the boat through the water toward the anchored end of the line.

Obviously the invention is susceptible to some change or alteration without defeating its practicability, and I therefore do not wish to be confined to the preferred embodiment shown in the drawings and described herein, further than I am limited by the scope of the appended claim.

I claim:

A trot line holder, comprising: a U-shaped base having an aperture formed in the respective end portion of its legs; a tubular shaft extending through and journaled by the apertures in the legs of said U-shaped base; a crank secured to one end of said tubular shaft; a reel having a hollow spindle contacting the inner surface of the respective end portion of the legs of said U-shaped base and journaled by said tubular shaft, said reel having flange-like end members positioned in spaced relation with respect to the inner surface of the respective leg of said U-shaped base, the periphery of each said flange-like end member having a series of circumferentially spaced-apart inwardly extending relatively narrow slots for loosely receiving, holding and releasing trot line leaders and hooks, whereby the hooks project outwardly of the respective flange-like end member into the space between the latter and the respective leg of said U-shaped base;

and means releasably locking said spindle to said shaft, said means including, a bracket having a cylindrical portion radially secured to the outer surface of one said flange-like end member, said bracket having alignedly apertured end closing members, a helical spring within said bracket, an L-shaped pin having one end portion extending coaxially through said bracket and said spring and normally urged by the latter toward engagement with the periphery of said tubular shaft, said tubular shaft having an aperture in its wall removably receiving the adjacent end portion of said pin, said bracket having an end portion extending longitudinally outward from the end of said bracket opposite said spindle and having a slot in its outermost surface removably receiving the end portion of said pin opposite said spindle.

References Cited in the file of this patent

UNITED STATES PATENTS

| | | |
|---|---|---|
| 1,765,695 | Owens | June 24, 1930 |
| 2,531,816 | Homoky | Nov. 28, 1950 |
| 2,629,197 | Duvall | Feb. 24, 1953 |
| 2,734,694 | Davidson | Feb. 14, 1956 |
| 2,936,652 | Gunzner | May 17, 1960 |

FOREIGN PATENTS

| | | |
|---|---|---|
| 66,809 | Norway | Sept. 27, 1943 |